(12) United States Patent
Malone

(10) Patent No.: US 7,991,624 B2
(45) Date of Patent: Aug. 2, 2011

(54) METHOD AND SYSTEM FOR THE REQUESTING RECEIPT AND EXCHANGE OF INFORMATION

(75) Inventor: Cheryl Malone, New York, NY (US)

(73) Assignee: Article One Partners Holdings, New York, NY (US)

(*) Notice: Subject to any disclaimer, the term of this patent is extended or adjusted under 35 U.S.C. 154(b) by 297 days.

(21) Appl. No.: 11/933,362

(22) Filed: Oct. 31, 2007

(65) Prior Publication Data
US 2009/0112712 A1    Apr. 30, 2009

(51) Int. Cl.
*G06Q 10/00* (2006.01)
(52) U.S. Cl. .......................................... 705/1.1; 705/500
(58) Field of Classification Search .................. None
See application file for complete search history.

(56) References Cited

U.S. PATENT DOCUMENTS

| | | | |
|---|---|---|---|
| 4,571,669 A | | 2/1986 | Tsujii et al. |
| 4,827,508 A | * | 5/1989 | Shear .............................. 705/53 |
| 5,754,840 A | * | 5/1998 | Rivette et al. ..................... 707/2 |
| 5,987,464 A | * | 11/1999 | Schneider ........................ 707/10 |
| 5,991,751 A | * | 11/1999 | Rivette et al. ..................... 707/1 |
| 5,991,780 A | * | 11/1999 | Rivette et al. ................. 715/255 |
| 5,999,907 A | * | 12/1999 | Donner ............................. 705/1 |
| 6,018,714 A | * | 1/2000 | Risen et al. ........................ 705/4 |
| 6,038,561 A | * | 3/2000 | Snyder et al. ..................... 707/6 |
| 6,131,085 A | * | 10/2000 | Rossides ........................... 705/1 |
| 6,157,947 A | * | 12/2000 | Watanabe et al. ............. 709/217 |
| 6,233,428 B1 | * | 5/2001 | Fryer ............................. 434/308 |
| 6,257,896 B1 | * | 7/2001 | Fargano ......................... 434/322 |
| 6,263,314 B1 | * | 7/2001 | Donner ............................. 705/1 |
| 6,339,767 B1 | * | 1/2002 | Rivette et al. ..................... 707/2 |
| 6,401,118 B1 | * | 6/2002 | Thomas ........................ 709/224 |
| 6,452,613 B1 | * | 9/2002 | Lefebvre et al. .............. 715/733 |
| 6,546,230 B1 | * | 4/2003 | Allison .......................... 434/350 |
| 6,556,992 B1 | * | 4/2003 | Barney et al. ..................... 707/6 |
| 6,606,608 B1 | * | 8/2003 | Bezos et al. ................ 705/36 R |
| 6,665,656 B1 | * | 12/2003 | Carter ............................... 707/3 |
| 6,694,331 B2 | * | 2/2004 | Lee ............................ 707/104.1 |
| 6,721,793 B1 | * | 4/2004 | Corless ......................... 709/229 |
| 6,915,268 B2 | * | 7/2005 | Riggs et al. ....................... 705/7 |
| 6,997,717 B2 | * | 2/2006 | Kienzle et al. ................ 434/262 |
| 7,058,602 B1 | * | 6/2006 | La Mura et al. ................ 705/37 |

(Continued)

FOREIGN PATENT DOCUMENTS
JP    2000268111 A    *    9/2000

OTHER PUBLICATIONS
www.bountyquest.com; retrieved from www.archive.org.*

(Continued)

*Primary Examiner* — Traci L Casler
(74) *Attorney, Agent, or Firm* — Kalow & Springut, LLP

(57) ABSTRACT

A method of obtaining information in a specific area from at least two persons having a defined level of knowledge in that specific area. A host, upon receiving a question for information, operates a web site platform for the exchange of information using the web site to send the question to each of the at least two persons for a response together with a suggested fee for a response to the question. Where the fee is not precisely fixed and at least one response to the question is received via the web site, a value is determined by subscribers to the website.

13 Claims, 6 Drawing Sheets

U.S. PATENT DOCUMENTS

| | | | |
|---|---|---|---|
| 2001/0049654 A1* | 12/2001 | Cecchetti et al. | 705/38 |
| 2001/0053513 A1* | 12/2001 | Corn et al. | 434/350 |
| 2002/0002524 A1* | 1/2002 | Kossovsky et al. | 705/36 |
| 2002/0022974 A1* | 2/2002 | Lindh | 705/3 |
| 2002/0046038 A1* | 4/2002 | Prokoski | 705/1 |
| 2002/0107709 A1 | 8/2002 | Colson et al. | |
| 2002/0110795 A1* | 8/2002 | Lemchen | 434/350 |
| 2002/0116247 A1* | 8/2002 | Tucker et al. | 705/8 |
| 2002/0165730 A1* | 11/2002 | Matsuda | 705/1 |
| 2002/0165818 A1 | 11/2002 | Meade, II | |
| 2002/0169743 A1* | 11/2002 | Arnold et al. | 707/1 |
| 2003/0028469 A1* | 2/2003 | Bergman et al. | 705/37 |
| 2003/0074559 A1* | 4/2003 | Riggs | 713/168 |
| 2003/0105706 A1* | 6/2003 | Stanglmayr | 705/37 |
| 2003/0110215 A1* | 6/2003 | Joao | 709/203 |
| 2003/0125978 A1 | 7/2003 | Paradiso | |
| 2003/0144877 A1* | 7/2003 | Goldmann et al. | 705/2 |
| 2003/0149780 A1* | 8/2003 | Inoue et al. | 709/229 |
| 2003/0195834 A1* | 10/2003 | Hillis et al. | 705/37 |
| 2004/0128224 A1* | 7/2004 | Dabney et al. | 705/37 |
| 2004/0205015 A1* | 10/2004 | DeLaCruz | 705/37 |
| 2005/0091100 A1* | 4/2005 | Riggs et al. | 705/8 |
| 2005/0144081 A1* | 6/2005 | Guler et al. | 705/26 |
| 2005/0203824 A1* | 9/2005 | Freud et al. | 705/37 |
| 2005/0288984 A1* | 12/2005 | Hamilton | 705/8 |
| 2006/0026146 A1 | 2/2006 | Tvito | |
| 2006/0085220 A1* | 4/2006 | Frank et al. | 705/1 |
| 2006/0106675 A1* | 5/2006 | Cohen et al. | 705/26 |
| 2006/0265259 A1* | 11/2006 | Diana et al. | 705/7 |
| 2008/0137550 A1* | 6/2008 | Jurca et al. | 370/252 |

OTHER PUBLICATIONS

Note Re ORA:CLE (1984).
Community Patent Review Project Summary. New York Law School Institute for Information Law & Policy. Sep. 2006. http://dotank.nyls.edu/communitypatent.
Bob Besaha. Bounty Hunting in the Patent Base. Communications of the ACM Mar. 2003: vol. 46, No. 3, p. 27-29.
P&G Submit a Technology archived webpage. http://www.web.archive.org/20040411145857/pg. t2h.yet2.com/t2h/page/submissionconditions. Apr. 11, 2004.
P&G Technology Transfer archived homepage. http://www.web.archive.org/20040403234657/pg.t2h.yet2.com/page/homepage. Apr. 3, 2004.
P&G Technology Transfer FAQ archived webpage. http://www.web.archive.org/20040411130154/pg.t2h.yet2.com/page/faq. Apr. 11, 2004.
Official Gazette Notice. Pilot Concerning Public Submission Of Peer Reviewed Prior Art. 2007.
Patent reform and third party submission of art: a proposed solution << Promote the Progress. http://promotetheprogress.com/patent-reform-and-third-party-submission-of-art-a-proposed-solution/358/. Apr. 28th, 2005.
Nicholas Varchaver. Patent review goes Wiki. Fortune Magazine. http://money.cnn.com/magazines/fortune/fortune_archive/2006/08/21/8383639/index.htm. Aug. 16, 2006.
Beth Simone Noveck. "Peer to Patent": Collective Intelligence, Open Review, and Patent Reform. Harvard Journal of Law & Technology vol. 20, No. 1, Fall 2006.
Home: Historical: Cryptographic Challenges: The RSA Laboratories Secret-Key Challenge. Jan. 28, 2007.
RentACoder archived webpages. http://web.archive.org/web/20070102010933rn_1/www.rentacoder.com/RentACoder/default.asp. Jan. 8, 2007.
RSA Factoring Challenge. "http://en.wikipedia.org/wiki/RSA_Factoring_Challenge" Mar. 18, 1991.
RSA Laboratories. © 2010 EMC Corporation. Jan. 28, 1997.
The RSA Laboratories Secret-Key Challenge. Jan. 28, 1997.
Spreadshirt Archived Webpages. http://web.archive.org/web/20070102182609/www.spreadshirt.net/? lang=en&locale=GB. (2007).
Staples Invention Quest archived webpages. http://web.archive.org/web/20070104043104/http://inventionquest.dja.com/. Jan. 4, 2007.
Kathleen Diener, et al. The Market for Open Innovation: Increasing the Efficiency and Effectiveness of the Innovation Process. RWTH-TIM Group, Jan. 2010. 144 pages. lulu.com.
The Rules—RSA Challenge. Jan. 28, 1997.
Threadless archived webpages. http://web.archive.org/web/20070102034935/www.threadless.com/help. Jan. 2, 2007.
TopCoder archived webpages. http://web.archive.org/web/20060101045331/http://www.topcoder.com/ Jan. 1, 2006.
Venture2 archived webpages. http://web.archive.org/web/20070213010111/www.venture2.net/index.php?submenu=for_consumer_product_companies&src=gendocs&link=ForConsumerProductCompanies&category=Main. Feb. 14, 2007.
Verhaert archived webpages. http://web.archive.org/web/20061231073917/http://www.verhaert.com/. Dec. 31, 2006.
Access Patent Group, LLC. General questions/answers about Patent Busting Forum. Feb. 27, 2005.
Damien Cave. Who ya gonna call? Patent Busters! Salon.com. Oct. 23, 2000.
Ruth Walker. Whose idea is it, anyway? 'Bounty hunters' track the validity of patents. The Christian Science Monitor. Jan. 17, 2002.
Wilogo archived webpages. http://web.archive.org/web/20061022061807/http://en.wilogo.com/. Feb. 3, 2007.
Fairness Interviews. Interviews. Fairness.com. Oct. 2000.
X Prize archived webpages. http://web.archive.org/web/20070101023418/http://www.xprize.org/. Jan. 1, 2007.
Yet2.com—using this site archived webpage. Apr. 5, 2001.
Yet2.com press release (Aug. 10, 1999).
YourEncore archived webpages. http://web.archive.org/web/20031127032056/http://www.yourencore.com/index.html. Nov. 27, 2003.

* cited by examiner

METHOD AND SYSTEM FOR THE REQUESTING RECEIPT AND EXCHANGE OF INFORMATION

BACKGROUND OF THE INVENTION

1. Field of the Invention

The present invention relates to method and system for requesting opinions, information and/or analysis.

2. Related Applications

This application is related to an application entitled "A Method and System For Requesting Prior Art From the Public in Exchange for a Reward" filed concurrently herewith, the contents of which are incorporated herein in their entirety.

3. Description of the Related Art

Wall Street investors rely on receiving information and analysis of daily investment and other information to execute trades in time frames of hours or even minutes. For example, the financial community is interested in the validity of patents in making investment decisions. Similarly, the validity of patent portfolios for public companies can affect stock prices, and knowledge about the validity of patents is applicable to valuing the company that owns the patents.

When the analysis of the information requires additional information from third parties, traditional research procedures are normally employed. These procedures involve contacting a relevant third party, such as outside analyst firms or one or more individuals with specific expertise in the area of interest. The information, which is to be analyzed, is outsourced to the firm or person and a response, for example immediate feedback or an in depth analysis of the outsourced information, is returned. This process can be repeated either serially or in parallel any number of times to increase the likelihood of receiving additional information that is both accurate and timely.

However, in almost all instances, the firms and persons whom the investor can access are limited to those known to the investor and possibly known to the investor's business contacts. The process is further limited by the time constraints placed on receipt of the additional information or analysis, which imposes a limit on the number of personal contacts (and their contacts) that can be accessed to insure timely receipt. A processing approach that can be implemented, for example, involves giving the information, which is to be analyzed to an investment bank or analyst form to garner the broader resources of large institutions. As an alternative, if the information is valuable and similar analyses are replicated for the investor's overall investment arena, the investor can hire a third party research provider or an expert in the field with substantially similar credentials to provide continuing related information or analysis. The above-mentioned procedures are useful in obtaining high quality people to provide on time and high quality analysis of various topics. However, these traditional research approaches have the limitations of predefined accessible contacts and time constraints.

Third party research providers accessed by investors have attempted to solve this limitation by gathering together a pool of experts in various disciplines to provide their subscribing investors with access to these individuals for consultation on information within their field of expertise on a timely basis. These sources of information and the analysis they provide increase the odds that the investor will receive high quality information. However, this traditional structure is limited to consultants who do not participate directly in the market determined value of the information they provide nor the market determined revenues of the information exchange.

In some instances members of the public have been requested to send relevant information to a central source, in this case, a company, which was sued for patent infringement. More particularly, Netscape presented a request on a web site which it hosts called mozilla.org (the text is available as of Feb. 10, 2000 at http://www.mozilla.org/legal/wangsuit.html) for prior art to defend against a patent infringement action by Wang (based on U.S. Pat. No. 4,751,669). The request was therefore made available to visitors of Netscape's mozilla.org web site. Visitors were asked to respond by providing prior art to invalidate the patent claims on a gratuitous basis. As of Feb. 10, 2000, Netscape reported that the case settled. The payment to the consultants who responded either was gratuitous or a fixed fee.

Another company, Bounty Quest, had a web site offering payments to those who can prove or disprove patent claims and providing a means to settling patent disputes between companies. The company hoped to exploit the concerns of those who feel that the US Patent Office is failing to serve the new economy. Bounty Quest encouraged scientists, engineers, professional researchers or any people with specialized knowledge to find evidence critical to issues of patent validity and share this information with companies involved in patent disputes. Bounty Quest essentially created a human search engine of knowledgeable "Bounty Hunters" who tracked down this type of fugitive information for fixed cash rewards. Bounty Quest rewards started at $10,000 and went higher than $1 million, depending on the value of the information as predetermined and set forth as a fixed monetary amount in the "bounty".

SUMMARY OF THE INVENTION

This invention taps into the best minds in the world to provide the highest quality analysis or answer to a set of facts or a question that is posed by a subscriber where the reply is time sensitive and for a fee for a response which can consist of either or both of fixed and variable components.

In an embodiment of the invention, individuals employed in a common field, such as Wall Street investors, subscribe to a service that sends information from the subscribers to experts in various fields for analysis in response to one or more specific questions. The information, which can be a specific or general question, a set of facts, a recent political event, etc. is broadcast to experts worldwide for an analysis in return for a finder's fee. A web site platform is provided for the exchange of information and communications between the subscribers, who provide the requests for information, and the experts who prepare the analysis or answers to the submitted question. The web site host (hereinafter "host") also provides for the exchanges and communication between the worldwide experts and the subscribers. The host can also support communications directly between subscribers and experts.

In an exemplary embodiment of the invention, a further incentive is provided to the experts and subscribers based on an auction of advanced notice of a finder's fee search answer where the auction bidders are the subscribers.

In another embodiment of the invention, a fixed monetary reward in the amount of, for example, $5,000 or $10,000 can be offered as an incentive for the experts to turn their immediate attention to the question being considered.

In a further embodiment of the invention, the subscribers can rank the answers they receive, for example, on a scale of 1 to 10 or any other ranking system appropriate to provide easily executed feedback from the subscribers in a quantifiable manner, which can function as a basis for revenue bonuses for distribution to the best performing experts.

In a still further embodiment of the invention, additional incentives can be provided to subscribers or institutions which employee subscribers motivate them to provide timely rankings, and thus encourage full participation in the ranking system. For example, one or more subscribers who have input the highest percentage of rankings entered can be awarded individual bonuses that can be related to the host's profitability.

In an additional embodiment of the invention, incentives can be provided to institutions to encourage their members or employees to participate as subscribers or experts in the information exchange.

In another embodiment of the invention, the host's profits can be distributed in various percentages to the host company. The institutional experts can be encouraged to be the investors in the host company since the investors will have the greatest incentive to have their members participate.

In another embodiment, the questions can be distributed to the subscribers before the search announcement, e.g., one hour before the search announcement, to allow the subscribers to judge the value of the process that is to begin, i.e., whether the information sought in the search would be valuable to them. Also, the replies or partial replies submitted by the experts can be distributed to the subscribers before the answer announcement to the public to allow subscribers to hedge or make trades before the information becomes public. In one embodiment the questions can be presented for the subscribers to bid for in auction for notice in advance of other subscribers with a percentage of the auction bid being given as additional compensation to the expert(s) providing the insurer(s).

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other systems and methods for carrying out the same purposes as the present invention. In the present invention, alternate equivalent embodiments may employ, whether in whole or in part, firmware and software. Further, elements of various embodiments can be combined. Those skilled in the art should also realize that such equivalent constructions do not depart from the spirit and scope of the invention in its broadest form.

BRIEF DESCRIPTION OF THE DRAWINGS

The foregoing and other aspects, features, and advantages of the present invention will become more fully apparent from the following detailed description, the appended claim, and the accompanying drawings in which:

DETAILED DESCRIPTION OF EXEMPLARY EMBODIMENTS

The application of the inventive information exchange to various subject matters as disclosed herein is without limit. It can be implemented, for example, as a resource for questions on patent law. In this context, the experts will be professionals and non-professionals in the patent field. As institutional experts, patent departments of law schools, patent or technology departments of universities, law firms, patent analysis companies, and patent law or technology research companies can be used. As individual experts, professors or employees affiliated with these institutions, patent law students, technology interested professionals or individuals can be used. Clearly, the subject matter of interest is not restricted to any one or group of subjects, but applies to various legal, technology or data sectors relevant to any issue. It may be implemented by submitting questions to multiple subsets of experts who can use any identifiable source of information to generate responses to the questions.

Figure 6:
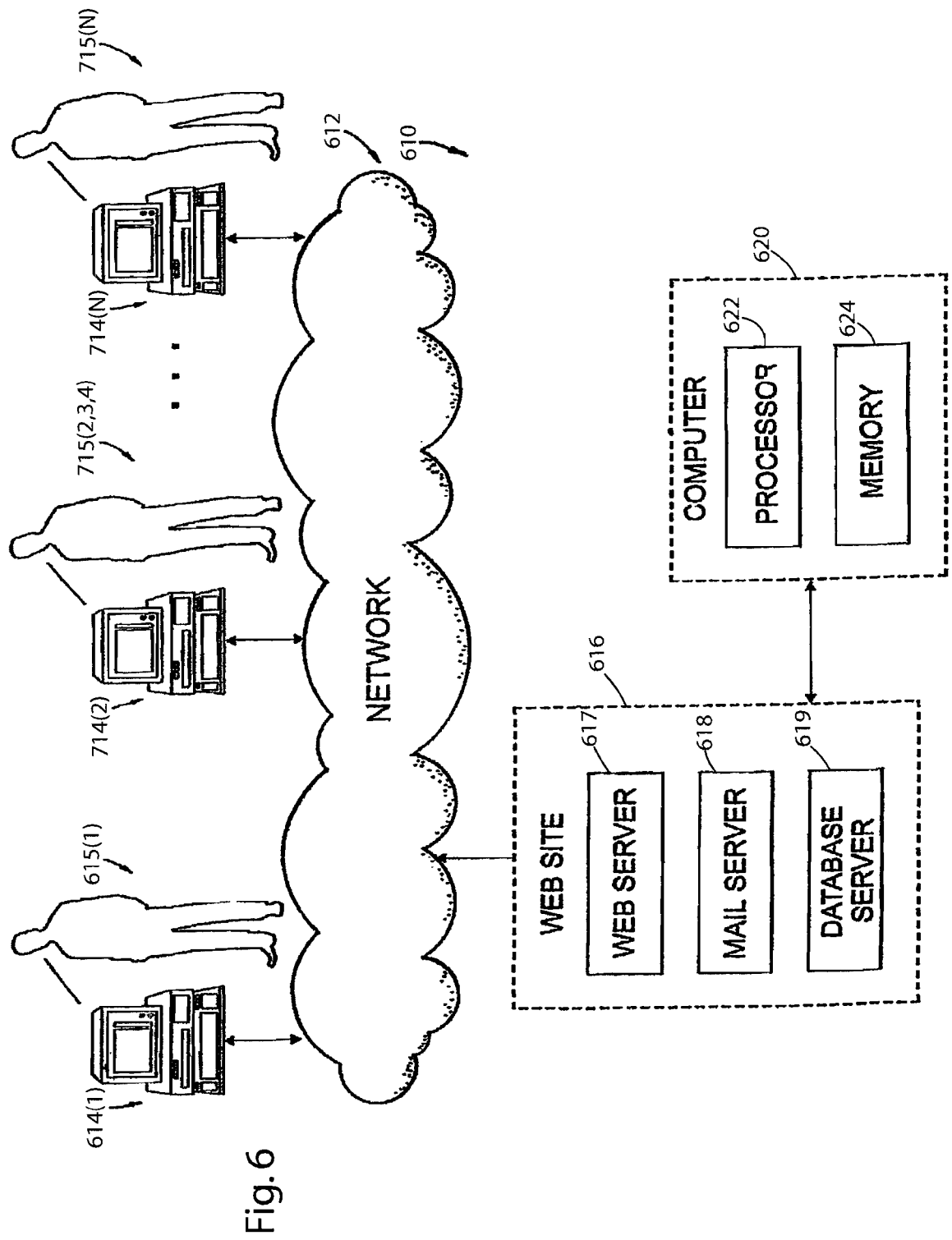
FIG. 6 is a block diagram of an exemplary system for carrying out the processes of the present invention.

The invention is particularly useful to the investment subscribers, such as Wall Street investors, because financial markets are very sensitive to new relevant information. When the area of interest relates to the financial community, the present invention may be implemented through a single exchange or multiple exchanges, each devoted to a different subject matter. An information exchange according to the present invention will be provided with hardware and software system 610 as shown in FIG. 6, with notification capability based on selected interests of the subscribers. The system 610 for implementing the information exchange can be setup to maximize the distribution of the highest quality information most efficiently, e.g., by utilization of the Internet 612 network, including the Internet or any type of Intranet or other types of networks. This could be used internally in a company. Further, the system 610 can be organized to maximize the revenue streams to the owners of the host website 616 which operates web server 617, mail server 618 and database server 619 using for example computer 620 including processor 622 and memory 624. Subscribers to the system 610 are shown as 615($i$) to 615($n$) connected through computers 614($i$) to 614 ($n$), or alternative communication means to system 610. Experts for example 715($i$) to 715($n$) to whom queries are put under the present invention could, in an exemplary embodiment, also be connected to the Network 612 through computers 614($i$) to 614($n$). Each institution or individual expert could each have such a connection or an alternative means of communication with system 610. The use of the term organization disclosed herein does not limit the scope of the invention as this term can take a variety of forms. For example, queries could be mailed to experts or published in newspapers instead of or in addition to publication over the Network or Internet. Similarly the results of a search may be published by mail or the press may publish the results. Further, broadcast media may be used to post queries to be searched and to disclose the results of the search. However, with broad unselected publication of the search request, non-experts may chose to submit answers. The system organizer may chose in certain circumstances to reward only answers from experts or to reward anyone submitting a valid answer.

FIG. 6 shows an example of an overall environment 610 in which this invention can be used. Environment 610 includes a network 612, such as the Internet, Intranet, "Future Net" or any other network known or later developed which connects computers. Consumer computers 614 are connected to the network 612. Computers 614 are shown as 614(1), 614(2) to 614(N) and they can be operated by users 615(1), 715(2,3,4) to 715(N). N as used herein denotes an unlimited quantity of the object to which it relates and the value of N can change for each object. Therefore, any number of computers 614, 714 can be connected to network 612 and each computer 614, 714 can be operated by any number of users 615, 715.

Also connected to network 612 is web site 616, in which an embodiment of this invention is implemented. Web site 616 posts one or multiple prior art requests.

Since web site 616 is also connected to network 612, users 615,715 can access web site 616 from any computer 614,714 throughout the world having appropriate network access and software, such as a web browser. In alternative embodiments, users 615, 715 can gain access to web site 616 or the business supporting it, including web site 616 employees, from other mechanisms, such as E-mail outside web site 616, facsimile or telephone.

Various hardware devices can operate web site 616. Such devices are a design choice which are well known to those of ordinary skill in the art and do not limit this invention. For example, a web server 617 can service users 615, 715 of web site 616, including storing and operating the applications, screen displays and images for web site 616 as well as the sub-systems for operating web site 616, etc. Also, a database server 619 can store databases requests, users 615, 715 responses, rewards and all other programs and data to support web site 616, etc. A mail server 618 also can be included in order to communicate E-mail between users 615, 715 and web site 616. Additional web servers, database servers and mail servers can be added to support an increased load on web site 616. Also, web site 616 can be generated, operated, updated and administered by a computer 620 that connects to servers 617, 618 and 619 supporting web site 616. Computer 620 operates based on a processor 622 under the control of a program. For ease of reference, such processing will hereinafter be indicated by the use of the term "Computer 620." Computer 620 also includes memory 624 (including one or more storage elements, such as a hard disk or RAM; additional memory can be added). Computer 620, processor 622 and memory 624 are used to access servers 617, 618 and 619 and run the software necessary for generating and maintaining web site 616. Computer 620 can also process communications between user 615, 715 and employees of web site 616, such as, for example, E-mail using mail server 618, facsimile or telephone, etc. In addition, computer 620 can be implemented in one or more computers such as, for example, computers 614, 714. Other alternative communications between users 615, 715 and the employees of web site 616 such as, for example, postal mail, facsimile, outside computer 620, etc. are also contemplated as within this invention. In addition, many other hardware configurations known in the art can be used to implement this invention.

It is understood that the application of the disclosed information exchange system 610 complies strictly with all United States and international laws involving the dissemination of information in general and financial information in particular. The system can implement specific processes to prevent the distribution of insider information, confidential information or information limited by contract to a third party vis-à-vis experts.

The experts can be qualified for participation based on executing a contract not to disclose any illegal, confidential or third party owned information or information which they otherwise are encumbered from disclosing (hereinafter, non-public information). In one embodiment, a focus for qualifying experts can be those professionals who owe a separate ethical or professional duty not to divulge any non-public information. For issues that relate to the financial environment, any additional processes available as part of the best practices on Wall Street can be employed to address this issue. Institutional experts can be required to implement an internal compliance process for their member or employee experts before the information can be submitted to the host for processing. The experts can be cleared for participation in the information exchange based on their agreement not to divulge illegal information or information which is illegal to divulge.

Figure 1:
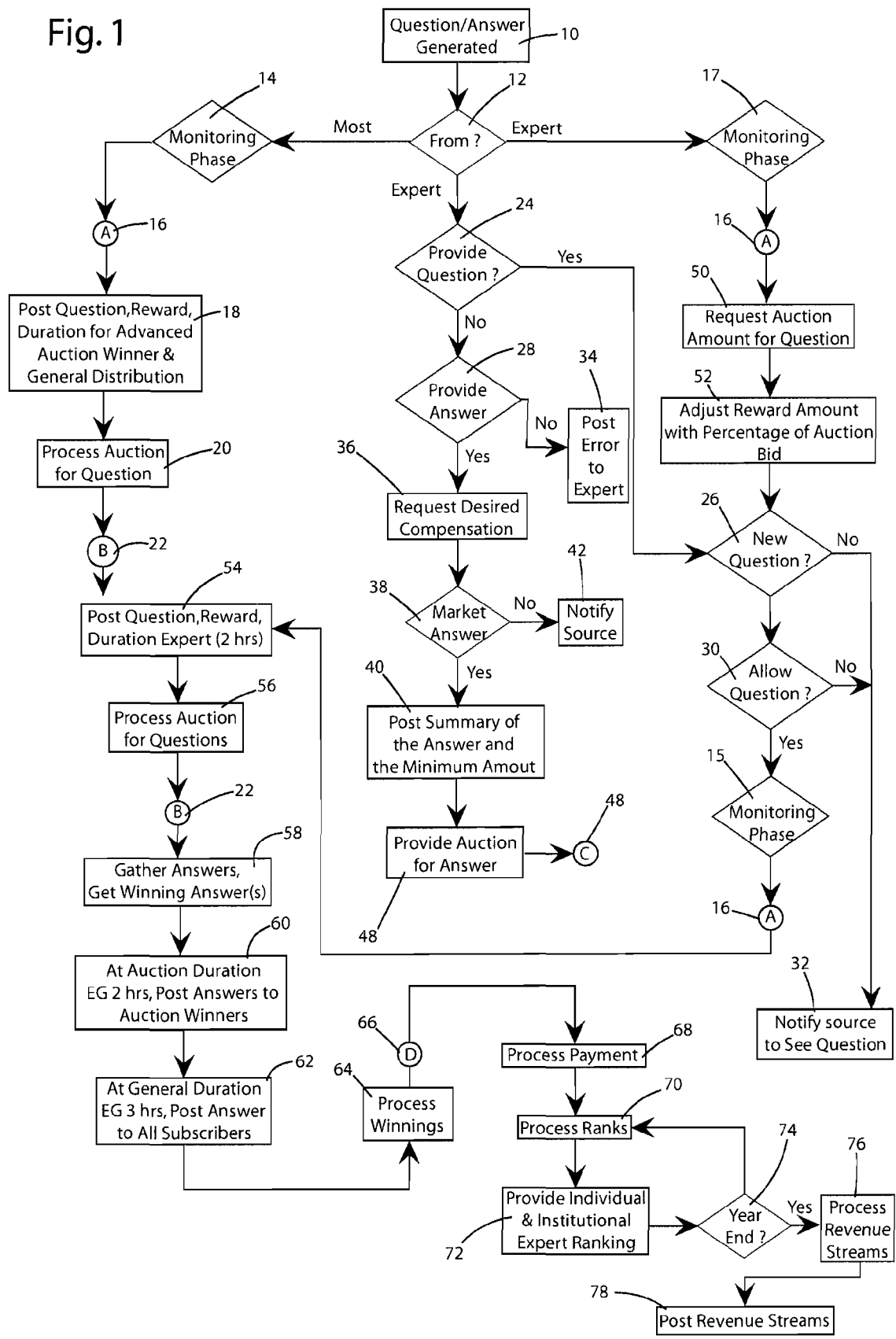
FIG. 1 is a flow chart of the process for the exchange of information according to the present invention.

Referring to FIG. 1, there is shown a flow chart of the general process of an embodiment of the information exchange. Operation of the system 610 forming the exchange can be triggered when a question or answer is generated (step 10). The source of the question or answer is then determined (step 12). The host can post questions which can be of interest to subscribers, subscribers can post queries that they have an interest in and value the answers by offering an amount for answers and experts can post. Where the question comes from the web site host 616 or other host of the information exchange, it can be monitored to determine if the experts will likely provide answers that will be of interest to subscribers (step 14). For example, upon launch or at the early stages of the information exchange, as the consistency of highest quality answers are being developed, the monitoring mechanism can ensure that answers will be received which are adequate to provide valuable information to subscribers before establishing an expectation by subscribers of receiving an answer(s) to the question. The monitoring process is shown in detail in FIG. 2.

Figure 2:
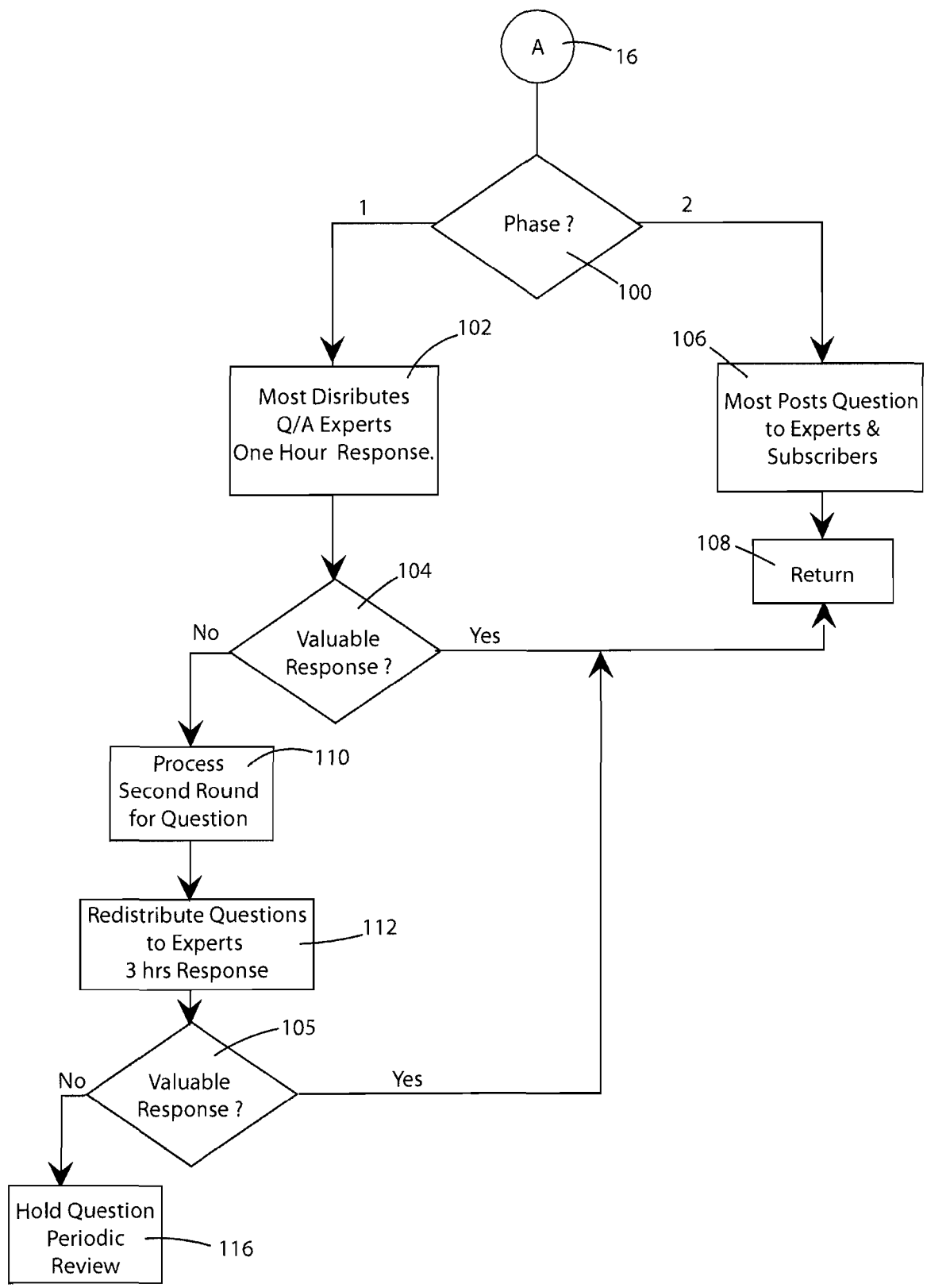
FIG. 2 is a flow chart of the monitoring step of the process of FIG. 1.

As shown in FIG. 2, the processor determines the phase of implementation for the exchange, such as for example, phase 1 being around the launch of the exchange and phase 2 being upon reaching a critical mass of experts (step 100). If the exchange is in phase 1, the question is presented to the subscribers for a one-hour review and feedback on whether the experts have information for the response to ensure that if the experts provide answers, those answers will be valuable to the subscribers. (step 102).

The host 616 that operates the information exchange can employ an in-house staff to monitor questions and also to provide fundamental answers where possible to questions on various subject matters. For example, patent lawyers or financial analysts on staff can provide basic information and/or verify or build upon answers from experts. When steps are hereinafter referred to as being executed by the host or exchange, it includes employees or those affiliated with the exchange with authority to make the described decisions. The host implements a process by which it determines within one hour whether the answers to the questions submitted (alone or in combination with in-house expertise) would be valuable enough to the subscribers to be worth distribution to the experts (step 104). The experts can also be enlisted to submit preliminary data or draft answers which may be improved in substance or presentation by the actual search, in order to give the exchange host some additional, although incomplete information as to whether a question under development is likely to have an answer valuable enough for distribution to subscribers. If the valuable response standards are met, processing is then returned to FIG. 1 (step 108). If the valuable response standards are not met, then the question can be discarded (not shown) or a second round of feedback from subscribers and experts can be initiated (step 110) by redistributing the question to experts only for a 3-hour response period (step 112). At the end of the second round, step 104 processing is re-executed (step 105). If the response(s) meet the valuable response standards, then step 106 is executed. If the standards are still not met, the question is held for periodic review (step 116). In an alternative embodiment, the question can be offered to experts for a longer-term project, such as an expert providing a response in the form of a question or answer after the expert produces a valuable response (not shown).

In FIG. 2, if the exchange is in phase 2 or additional phases (not shown), the question can be posted to experts and the answer provided to subscribers without monitoring by the exchange host. There can be intermediate phases where periodic monitoring occurs or monitoring can be flagged depending upon the particular source of the question or answer (not shown). The processing is then returned to FIG. 1 (step 108).

If the processing is returned to step 16 in FIG. 1, the processing continues as follows: The question, the finder's fee and the duration of the search are posted to the web site or otherwise distributed with, in one embodiment an advanced duration for distribution based on an auction of 2 hours and a general distribution of 3 hours (step 18). The auction is then conducted (step 20) with the process being shown in FIG. 3 (step 22).

Figure 3:
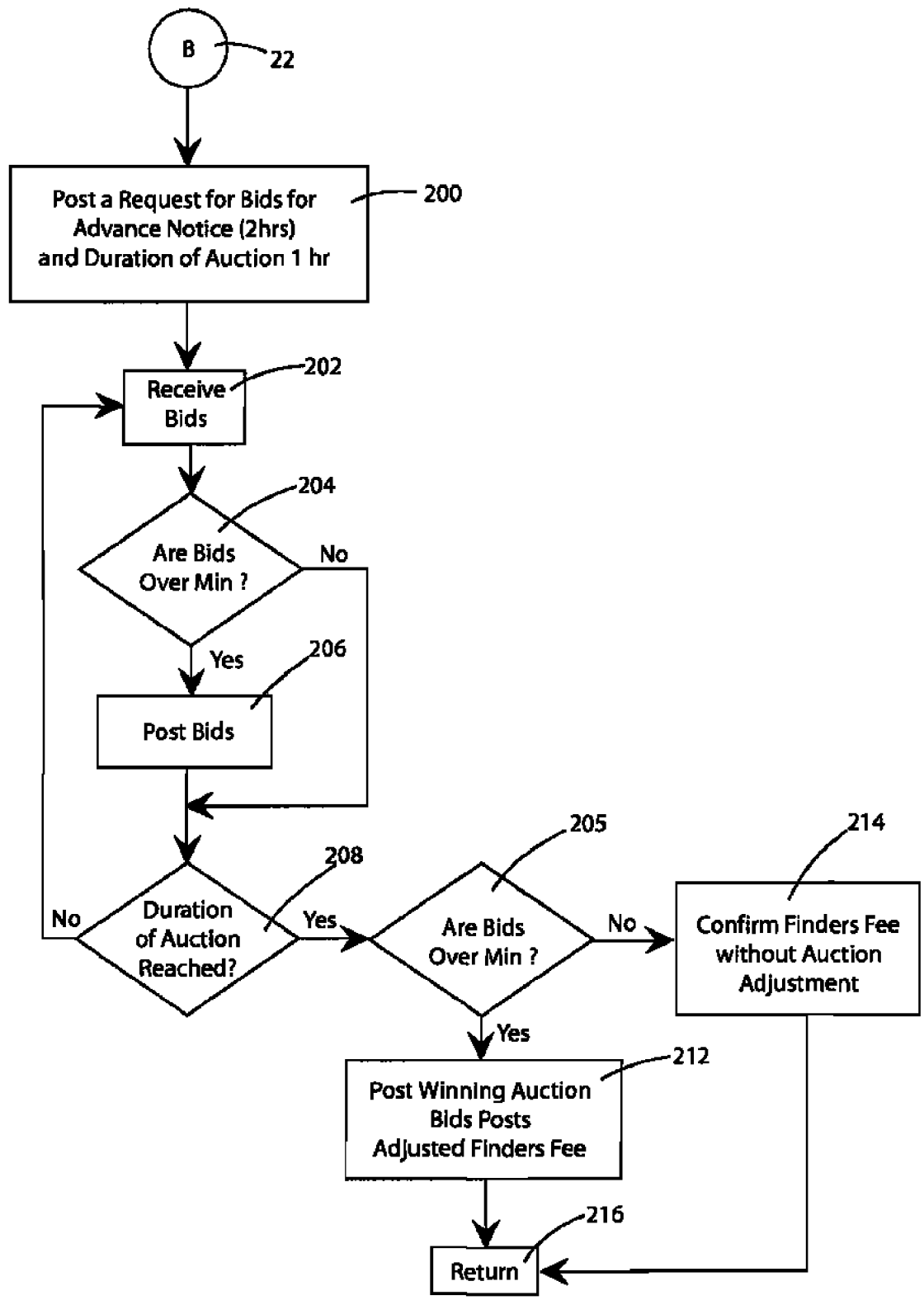
FIG. 3 is a flow chart of auction bids portion of the process of FIG. 1.

In FIG. 3, a request is posted for auction bids. What is being auctioned is advanced notice to one or more bidders of the answer to the question. If more than one winner is permitted the advanced notice will be the same for each winner or timed according to the amounts of winning bids. Also there will be a fixed duration for the auction, for example, 1 hour (step 200). In one embodiment, there can be a minimum for auction bids. Next, the exchange receives bids (step 202) and determines whether the bids are over the minimum (step 204). If there is a bid over the minimum, then the bid is posted on the site to stimulate further auction bids (step 206). In an alternate embodiment, the bids can remain private or only bids over a predetermined amount that may be higher than the minimum bid are posted (not shown). If the bid is not over the minimum, then the exchange determines whether the duration of the auction has occurred (step 208). If not, then processing is returned to the receipt of additional bids (step 202). If the auction duration has occurred, then step 204 processing is re-executed (step 205) to determine whether the auction bids exceed a minimum. If the minimum auction bid is exceeded, the exchange posts the winning bid(s). The fee to the expert for providing the first or best answer to the question can be set to depend on the size of the winning bid. Thus, instead of a fixed amount, as in prior systems, the expert's fee is in a sense related to the importance of the answer as determined in the auction.

When the winning bid is posted, any adjustment to the finder's fee, if the finder's fee includes a percentage of the auction-winning amount, is also posted (step 212). It is here noted that an automatic fee analysis engine, i.e., software that sets the fee based on a variety of factors, can determine the fee. In an alternative embodiment, the winning bid(s) are not posted (not shown). Processing is then returned to step 22 in FIG. 1 (step 216). If the minimum bid is not met, then the finder's fee without any adjustment for a winning auction bid is confirmed (step 214). In an alternative embodiment, no announcement is made that the auction was unsuccessful.

Returning to FIG. 1 from FIG. 3, if the answer to step 12 determines that the source of the question is an expert, then the exchange determines if the expert provided a question (step 24). If it is a question, then the exchange determines if it is a new question (step 26). In alternative embodiments, the analyses of the question presented can include decisions about the value of the answers or any other factor to determine whether the question is valuable to the exchange or will produce value for subscribers. If it is not a question, the exchange determines whether it is an answer to a previously posted question (step 28). The invention also contemplates that experts may provide answers to questions that have not been posted, but which the expert believes will have value to the subscribers. Thus, an answer can include broadly any analyses of information that does not seek information but rather provides it. If it is not an answer, then the exchange communicates to the expert that he/she has made an error (step 34). If it is an answer to a question that has not been posted, the exchange requests from the source expert the desired compensation (step 36). The exchange then determines whether to market the answer (step 38). If the exchange determines not to market the answer, it notifies the source expert (step 42). In an embodiment, the exchange can provide feedback and collaborate with the source expert to improve or otherwise modify the answer to produce a saleable product (not shown). If the answer is accepted, then the exchange processes the sale of it to subscribers by posting an incomplete version of the answer (for example, a summary) and in some embodiments a minimum bid amount (step 40). The exchange then processes an auction for the answer (step 48).

Figure 4:
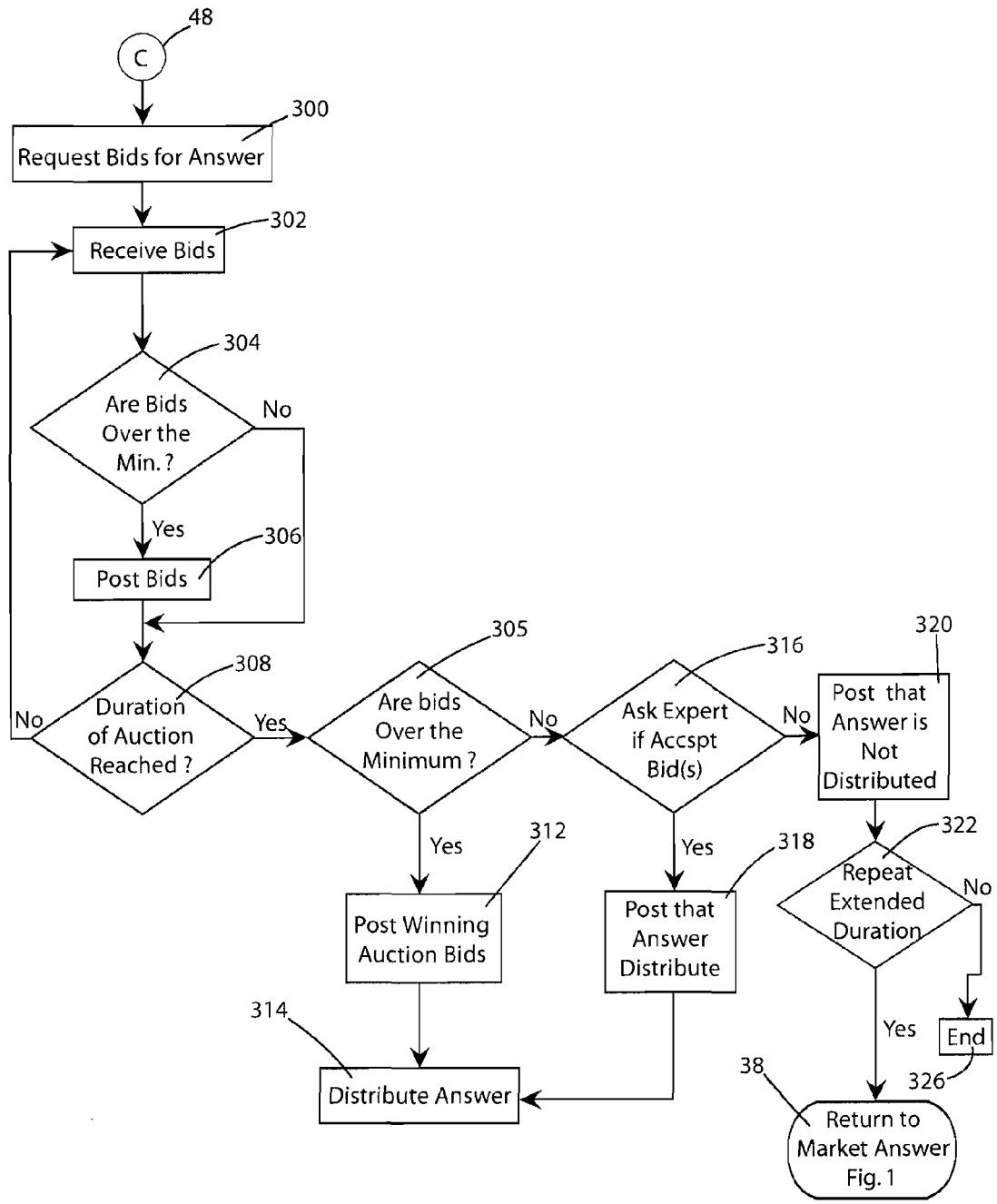
FIG. 4 is a flow chart of the portion of the processing involved in an auction for an answer of FIG. 1.

The auction processing for an answer is shown in FIG. 4 (step 48). A request is posted for auction bids for the answer (step 300). The exchange receives bids (step 302). In one embodiment, there can be a minimum for auction bids. The exchange determines whether the bids are over the minimum (step 304). If the bid is over the minimum, then the bid is posted on the site to stimulate further auction bids (step 306). In one embodiment, the bids can remain private or only bids over a predetermined amount that may be higher than the minimum bid are posted (not shown). If the bid is not over the minimum, then the exchange determines whether the auction has gone on for the specified duration (step 308). If not, then processing is returned for the receipt of additional bids (step 302). If the scheduled auction duration has expired, then step 304 processing is re-executed (step 305) to determine whether the auction bids exceed a minimum. If the minimum auction bid is exceeded, the exchange posts the winning bid(s) (step 312) and distributes the answer (step 314). In an embodiment, if the minimum auction bid is not met, the exchange can request whether the expert will accept the highest bid (step 316). If the expert will accept the bid, then the exchange posts that the answer was distributed (step 318) and distributes the answer to the winning bidder. In another embodiment, the winning bid is not posted if it is less than the minimum presented in the original posting (winning bid is not posted in step 318). If the expert does not accept the bid, then the exchange can post that the answer has not been distributed (step 320) and the outcome of the auction can remain private (not shown). In a further embodiment, the answer can be posted again for auction with an extended duration (step 322). If the expert agrees to an extended duration auction, then the processing is returned to step 38 in FIG. 1. If the expert declines an extended duration auction, then the processing for the answer is ended (step 326).

Returning to step 26 of FIG. 1, if the information presented by the expert is a question, then the exchange determines whether to allow the question (step 30). If the question is not allowed because the question is already under consideration, the exchange notifies the expert to see a pending question (step 32). In alternative embodiments, an explanation is provided to the expert of the reason the question is being rejected, if for a reason other than that it is a duplicate question, for example, that an answer would not be valuable enough to market on the exchange (not shown). If the question is allowed, the exchange implements the monitoring phase processing (steps 15 and 16, FIGS. 1 & 2). Processing is returned to step 16 of FIG. 1 and the exchange then posts the question, finder's fee, duration of advanced notice to be received by the winner and the general distribution (steps 54 and 56). Auction processing is implemented for the question (step 22, FIG. 3).

Regardless of the source of the question, once approved and the auction process completed, the host posts and/or distributes the question to the experts. The exchange then gathers the responses to the question by the experts and determines whether there are winning answer(s) (step 58). In this embodiment, the monitoring phase step 14 is implemented so that an answer is available for distribution. At advanced auction duration, the exchange posts the answer(s) to the auction winners (step 60) first. At the general distribution duration, the exchange posts the answer(s) to all of the subscribers (step 62).

Figure 5:
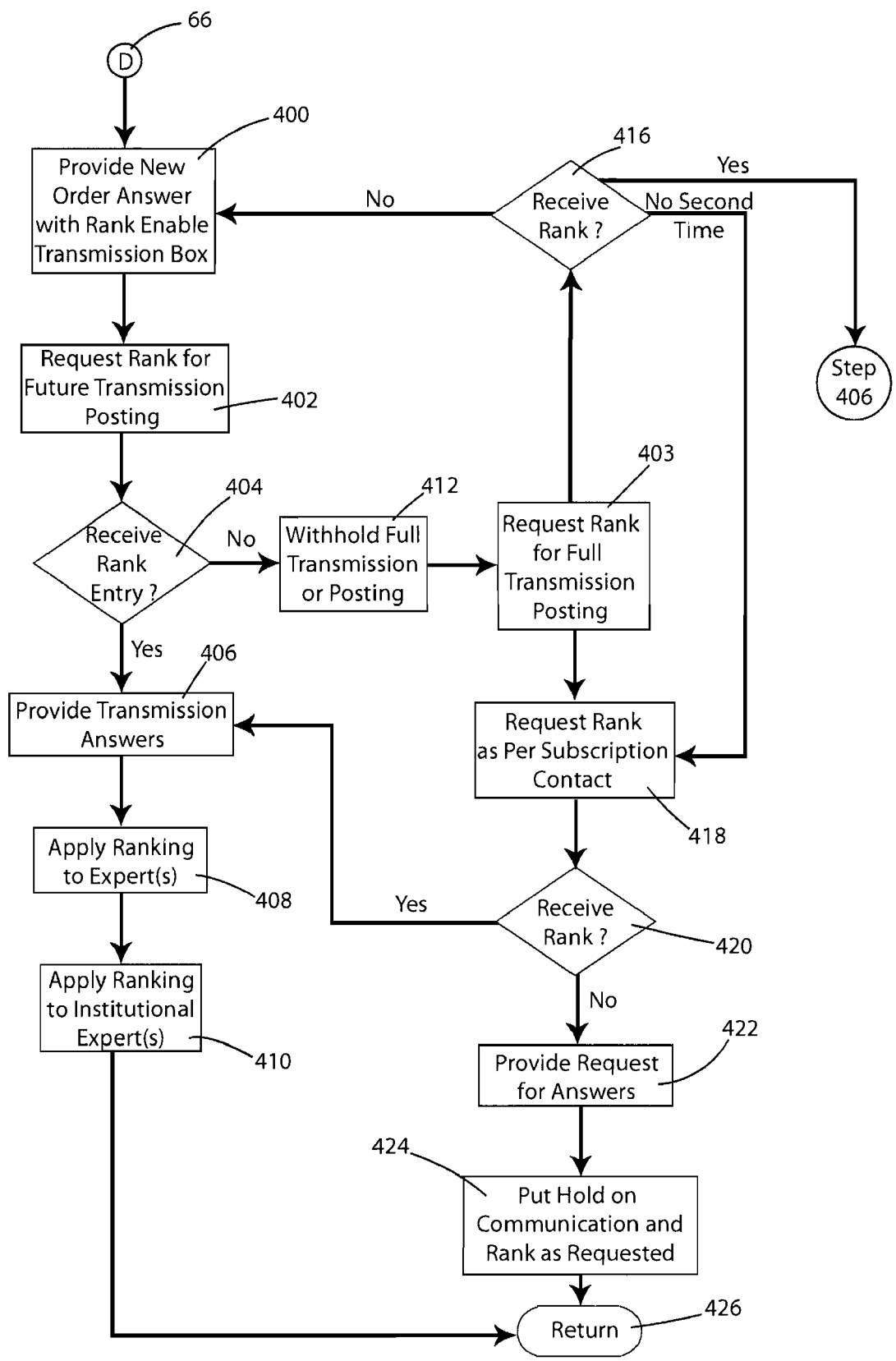
FIG. 5 is a flow chart of the steps for ranking the answers in the process of FIG. 1.

The rankings for the source(s) of the answers are then executed by the exchange (steps 64 and 66, FIGS. 1 & 5). The answer distributed to the subscribers, e.g., by e-mail, includes a functional ability to require the subscribers to input a ranking or designation of value of the answer in an electronic response. The distribution can be a read-only distribution with no ability to transfer or communicate the answer or any part of it until a ranking is indicated (for example, a pop-up box is included with the answer which requires that the subscriber select a box with a ranking number in order to fully have access to the answer) or in order for the subscriber to close the window containing the answer, an "x" icon or close button is replaced by a mechanism to enable the subscriber to assign value to the answer while at the same time closing the transmission. For example, the instructions can provide that by selecting a ranking, the ranking is transmitted to the exchange in combination with the transmission being closed. Any technical hardware or software solution can be employed to replace the close icon with a ranking indication, whether selecting from among several rankings or entering a ranking to accomplish the ranking in combination with the close button (step 400, FIG. 5). In this way, the subscribers provide feedback to the exchange in the same number of processing steps that it takes to close the transmission. In an embodiments, a separate pop-up box that requests rankings can be employed. Incentives can also be given to subscribers to provide rankings, such as, a percentage of the host's profits for the highest number of rankings submissions with ties initiating a lottery system. A single action process, whether activation of a button, icon or any other technical solution, which combines closing a window with providing information about the value of the information in the window, is a separate invention as well as an embodiment of this invention. The single action process can replace the traditional close button for one use of providing value feedback information to the source of the window.

In FIG. 5, the exchange requests that the subscriber provide a rank for the answer in order to receive a fully accessible transmission (step 402). The exchange determines after a predetermined period of time (for example, ½ hour) whether a rank entry or selection has been received (step 404). If the rank information has been received, the fully accessible transmission is distributed or posted (step 406). The rankings are applied to the individual expert(s) (step 408) or institutional expert(s) (step 410). Returning to step 404, if the rank is not received, the full transmission/posting is withheld (step 412). The step 402 processing request for ranking is then re-executed (step 403). If the rank is received (step 416), then the full transmission answer is provided (step 406). If the rank is not provided, then step 400 processing is re-executed and if the rank is not provided for a second time, then the exchange communicates a specific request to the subscriber to provide the rank as per the subscription contact (step 418). If the rank is received (step 420), then the full transmission answer is provided (step 406). If the rank is not received, the exchange can put a hold on distributions to the non-complying subscriber until the rank is received (step 424). The submission of ranks from subscribers, either alternatively or in addition, can be encouraged through incentives and there need not be any impact on service for the subscriber who does not provide ranks. Where step 406 full transmission is provided based on receiving a rank(s) by the subscriber, the rank(s) are applied to the individual expert(s) (step 408) and institutional expert(s) (step 410) for the determination of periodic bonuses, and the processing from either step 410 or 424 is returned to FIG. 1 (step 426) at connection 48.

Returning to FIG. 1 from step 66, the payments to experts for finder's fees and from subscribers for auctions are processed (step 68) by, for example, an automatic fee analysis engine. The ranks are processed for individual and institutional expert(s) (step 70). The exchange can post current rankings for individual and institutional expert(s) as part of the exchange to stimulate competition (step 72). To process the revenue bonuses based on ranks, the following processing can be executed: the exchange determines if the periodic bonus distributions are timely (for example, on a yearly basis whether the yearly distribution time has arrived) (step 74). If the periodic distribution time has arrived, then the revenue streams to one or more of individual expert(s), institutional expert(s), subscribers et al. are processed (step 76) and the revenue streams can be posted on the exchange to stimulate competition (step 78). If the periodic bonus distribution date has not arrived, then the processing of ranks continues until that time (step 74).

In FIG. 1, where the question/answer originates from a subscriber, the exchange executes the monitoring phase step 17. Then, if the question is acceptable according to the FIG. 2 process, the exchange communicates with the subscriber to determine an auction amount for the question (step 50). In an alternative embodiment, the incentive for subscribers to offer questions is that if they are accepted, the source subscriber automatically receives an advanced notice distribution of the answer. In one embodiment, there can be a limit to the number of questions for which the subscriber can get gratuitously advanced distribution regardless of whether the subscriber is the source of the question. The finder's fee amount is then adjusted where the subscriber offers an auction amount (step 52) and the processing continues as a new question in step 26.

In practicing the invention, individuals employed in a common field, such as Wall Street investors, subscribe to the service run by the host or exchange. It then sends requests for information, in the form of one or more specific questions, from the subscribers to experts in various fields for analysis. The information, which can be a specific or general question, a set of facts, a recent political event, etc. is broadcast to experts worldwide for an analysis in return for a finder's fee. A web site platform is provided for the exchange of information and communications between the subscribers who provide the requests for information and the experts who prepare the analysis or answers to the submitted question Typically time-sensitive questions critical to investment decisions are presented on the web site. One or more of the host, subscribers and/or experts can initiate the questions. Experts provide answers to the questions. The host selects the best answer or combination of answers, posts them and pays a finder's fee to the source expert(s). The finder's fee can be a fixed monetary amount and/or include a variable component tied to the quality of the information, profitability of the host or other variable incentives. For example, revenue stream bonuses can be distributed on a question basis where an expert provides an answer that results in an increase in the profitability of the host or exchange, such as, for example, a surge of new subscribers.

A further incentive can be provided to the experts and subscribers based on an auction of advanced notice of the finder's fee search answer with the auction bidders being the subscribers. There can be two or more distributions of the answer for this embodiment, one or more advanced distributions and another general distribution. The finder's fee can include a percentage of the auction-winning bid. For example, where the time frame for providing an answer to the subscribers generally is 3 hours from the announcement of the question, (although the time frame can be shorter or longer, e.g., days or weeks, the duration does not limit the scope of the invention) advance notice of 2 hours is provided to the top auction bidder, top limited number of auction bidders (for example, 2 or 3), or the advanced notice can be varied as a function of the top limited number of auction bidders (for example, the top bidder receives 2 hours advanced notice, runner up 1.5 hours and third 1 hour).

A fixed monetary reward in the amount of, for example $5,000 or $10,000 can be offered as an incentive for the experts to turn their immediate attention to the question being considered. The auction bid amounts can have minimums, e.g., $5,000 or $10,000. The auction-winning bid can then be provided in whole or part as a component of the finder's fee amount. For example, the total amount can be distributed as 30% for the host and 70% for the expert. The auction bidding can be posted to stimulate further bidding. In contrast, all bidding can be withheld from distribution to any of the participants, experts or subscribers.

In an embodiment of the invention, the subscribers can rank the answers they receive, for example, on a scale of 1 to 10 or any other ranking system appropriate to providing easily executed feedback from subscribers in a quantifiable manner to provide a basis for revenue bonuses to high performing experts. On some periodic basis, for example, quarterly or yearly, the expert(s) with the highest rankings can receive an added incentive bonus, for example, a percentage of the host's profits (such as 5% or 7%). The rankings and/or revenue stream to date can be posted on the web site to stimulate expert participation (this information can be provided to the experts or only the subscribers). Other levels of bonuses can be provided to experts to spur on participation on a more general basis. For example, any expert who provides a minimum number of answers ranked at 7 or higher can participate in a periodic lottery for a percentage of the host's profits. In contrast, all information about periodic rankings can remain private. To continue with the example of 5% or 7% for the highest-ranking expert, the lottery can allocate a smaller percentage such as 1%, 2% or 3%.

Further incentives can be provided to subscribers to provide timely rankings to encourage full participation in the ranking system. For example, one or more subscribers with the highest percentage of rankings input, may receive individual bonuses that can be related to the host's profitability.

Further incentives can also be provided to institutions to encourage their members or employees to participate in the information exchange. For example, the institution with affiliated experts whose experts receive the cumulative highest rankings compared to any individual expert and/or a combination of experts from another institution may receive an added incentive bonus, for example, a percentage of the host's profits (such as 5% or 8%).

The investors in the host company and the winning institutional experts can be the same entity. An example of distribution of the host's profits can be, for example, for the host company, for investors in the host company, ranking winning institutional experts and ranking winning individual experts: 70%, 20%, 8% and 2% or 70%, 20%, 5% and 5%; or 70%, 18%, 7% and 5% (these are exemplary, any percentage combinations are within the scope of the invention). These are merely exemplary and can be modified to any combination including the host company receiving a smaller percentage than any one or more of the other participants in the revenue stream. Subscribers providing rankings also can participate in a percentage of the exchange or host's revenues, for example, 1%, 2% or 5% et al. Where the investors in the host company and winning institutional experts are the same entity as investors, they will have the greatest initial incentive to have their members participate. In such a case the host itself need not make a profit and all the profit can go directly or indirectly to ranking winning institutions and winning individual experts without any investor percentage. In such an event the investors do not participate in a percentage of the company profits. Also, the host's profits can be higher or a greater share than that given to institutional experts and individual experts.

The time frames for processing a single finder's fee search can begin with the announcement of the search to the experts and a request for information about whether any expert can produce a response in the timeframe for distribution to the subscribers. If the host is satisfied that a response is forthcoming, the search announcement can be given to subscribers to start an auction. For example, the search announcement and questions can be distributed to the subscribers with one hour time limit to judge the value of the answers or partial answers submitted to determine whether a valuable answer will be available should the question be distributed to subscribers. If the host determines that a valuable answer will be forthcoming, the question can be sent to the experts with a general distribution to all subscribers of, for example, 3 hours. This can be particularly applicable during the early phases of the exchange to ensure that subscribers who rely on the distribution of an answer at the end of the question duration receive valuable information. In this case, the 1-hour can be applied prior to the posting of the question to the subscribers so that the total duration from initial introduction of the question to the experts is 4 hours and to the subscribers is 3 hours in this embodiment. The time periods can vary and these examples are merely exemplary and do not limit the scope of this invention.

Around the same time, the auction can be announced, with a duration of one hour, for distribution of the answer(s) in advance of the general subscription distribution. To continue with the 3-hour time frame from announcement to subscribers until general distribution example, the advanced notice can be 2 hours or varied depending on the auction structure for top winners to get the same or varied distributions. These times can be expanded or contracted (for example, the best answer(s) in 15 or 30 min.) as a function of maximizing the information and/or timeliness of any information in the answer. Multiple distributions also can be built in for initial answers (e.g., 15 or 30 min.) followed by more developed answers according to specific time frames or on an ongoing basis. The auction structure can be built into any of the distribution structures. For example: the auction can be for a 15 min. answer as advanced notice with the auction duration of 10 min.; or the auction can be for 5 min. advanced distribution of ongoing answer(s) with the first distribution at 10 min. after a 5 min. auction etc. The structure of the auction and general distribution can be driven by the value of the information at issue and by maximizing the exchange structure for profit to all those involved in the revenue streams. The finder's fee search structure can also be implemented without an auction component. The distribution can include a single best answer or a combination of answers from various experts.

There are many alternatives for the payment of finder's fees and allocation of rankings. For example: where the answer is a combination of multiple responses from experts, primary and secondary parts can be identified and the finder's fee can go to the primary answer with the additional information being secondary; the finder's fee can be divided and apportioned to the primary and secondary experts; the ranking for the answer(s) can be broken down into rankings for each contributor or applied to each of the experts to give secondary experts with more focused points the benefit of providing more narrow information as an adjunct to primary information; or, for a single or primary expert for an answer, a minimum finder's fee can be guaranteed (for example, $5,000) and for a secondary expert, a smaller finder's fee can be guaranteed and the secondary expert can gain the benefits of additional ranking opportunities separately or in combination with the primary expert.

In a further embodiment of the invention, the exchange can facilitate personal exchanges generally between experts and subscribers (for example, in later phases of the exchange implementation) or on a consulting basis. These personal interactions can result in additional opportunities for ranks, such as for example, double ranking points for personal appearances, whether a meeting or triple points for presentations with a percentage of income earned directly from the subscriber being paid to the exchange. Where the incentive of bonus revenue distribution is high enough based on the rankings system, personal contact can be facilitated and will profit the exchange.

Experts also can provide time sensitive information, analyses and/or answers for investment decisions of the host. The host can then determine whether to market the information for the expert depending on the quality of the analysis. The host can present it as a question to stimulate the generation of the highest quality information. The host can initiate questions based on, for example, an important news event on Wall Street that must be analyzed to provide subscribers with the highest quality analysis upon which to base their investment decisions. Experts can initiate questions based on information they deem to be relevant to investors. The answers to questions can be required by the host to be provided on a time critical time frame, so the experts can gain an advantage in providing an answer to a question that they pose. Subscribers can initiate questions that are of particular importance to them. The derivation of questions from all sources enhances the robust nature of the exchange.

The host also can add specific news blasts with general information.

As the system matures and becomes more robust and answers are readily available to questions, the host can reduce monitoring or enable the exchange of information to occur on a free market basis, to the extent that any alternative structures comply with all applicable United States and international laws.

he reward amounts and percentages and the time frames provided herein are merely exemplary and can be scaled up or down without limit with the objective of balancing profitability for the host with monetary levels sufficient to maximize time critical participation of individuals and institutions and the quality of the answers.

None of the examples of structure or implementation of finder's fee searches is intended to limit the scope of the invention. Rather, they are exemplary of the numerous and varied implementations of the finder's fee search and incentives to optimize the generation of time critical information, including or omitting the auction component and any or all of the additional incentive components discussed herein.

While there has been described herein the principles of the invention, it is to be clearly understood by those skilled in the art that this description is made only by way of example and not as a limitation to the scope of the invention. Accordingly, it is intended, by the appended claims, to cover all modifications of the invention that fall within the true spirit and scope of the invention.

What is claimed is:

1. A method for obtaining information comprising
a host website making a request for information accessible to a plurality of experts over a network;
the host website receiving responses from said experts pertaining to the request for information;
the host website gathering the responses and determining a best response to the request for information;
the host website performing an auction among a plurality of subscribers for advanced notice of the responses provided by said experts; and
the host website performing an automatic fee analysis that determines a reward for the best response to the request for information that is based in whole or in part on an auction winning amount for the response.

2. The method according to claim 1 further comprising permitting only subscribers who have been granted permission by the host website to participate in the auction.

3. The method according to claim 2 further comprising verifying that said request is received from a subscriber to a service operated by said host website.

4. The method according to claim 1 further comprising verifying that the response is submitted by a person who is recognized by said host website as authorized to submit said response.

5. The method according to claim 1 further comprising distributing one or more responses to a set of subscribers.

6. The method according to claim 1 further comprising storing said experts' responses and a ranking for each response.

7. The method according to claim 1 further comprising the host website keeping a portion of the reward.

8. The method according to claim 1 further comprising providing an expert with contact information of a subscriber that permits the expert to communicate directly with the subscriber.

9. The method according to claim 6 further comprising storing said experts' responses for a plurality of requests for information and rankings for each response for said plurality of responses.

10. The method according to claim 8 further comprising calculating a bonus based on said rankings and paying said bonus to one or more experts.

11. The method according to claim 5 further comprising distributing the one or more responses to said subscribers in a read-only distribution format that prevents the distributed responses from being transferred or further communicated until the subscriber provides a ranking to the host of the one or more responses.

12. The method according to claim 11 further comprising the host storing the ranking in a database and associating the ranking with the expert who submitted the response.

13. The method according to claim 2, wherein the auction is conducted over said network.

* * * * *

UNITED STATES PATENT AND TRADEMARK OFFICE
CERTIFICATE OF CORRECTION

| | | |
|---|---|---|
| PATENT NO. | : 7,991,624 B2 | Page 1 of 1 |
| APPLICATION NO. | : 11/933362 | |
| DATED | : August 2, 2011 | |
| INVENTOR(S) | : Cheryl Milone | |

It is certified that error appears in the above-identified patent and that said Letters Patent is hereby corrected as shown below:

Title Page:

Item (75) Inventor, delete "Cheryl Malone, New York, NY (US)" and insert --Cheryl Milone, New York, NY (US)--

Signed and Sealed this
Fourth Day of October, 2011

David J. Kappos
*Director of the United States Patent and Trademark Office*